July 15, 1958 — A. J. HUCK — 2,843,718
AIR HEATER
Filed April 29, 1957
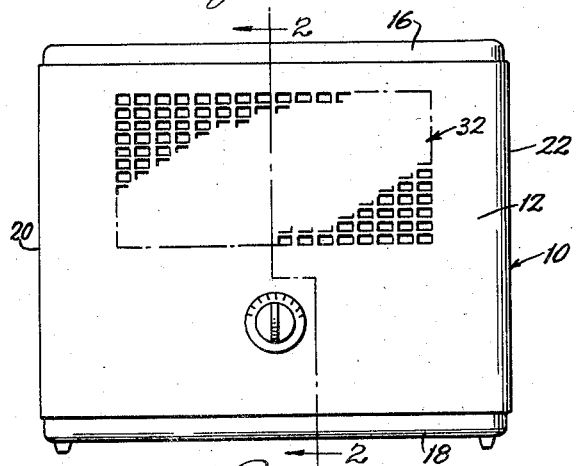
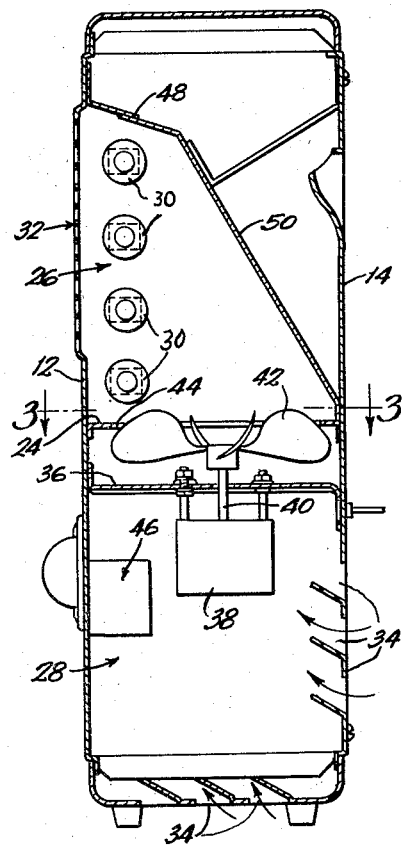
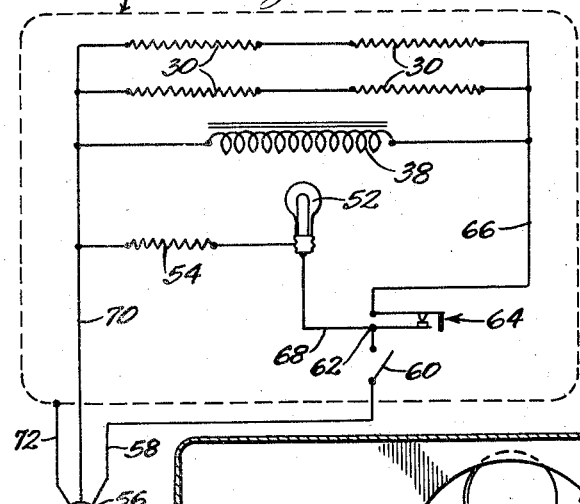
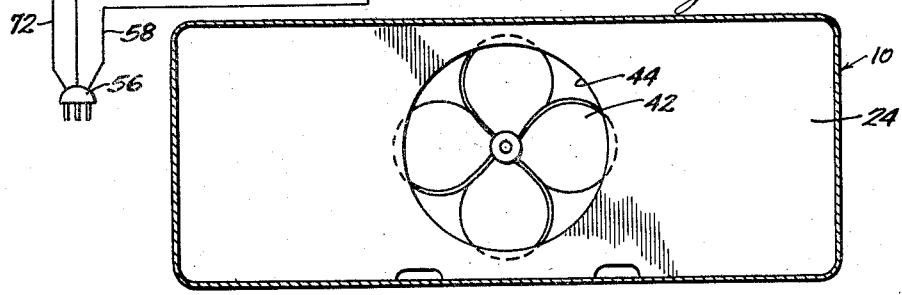
INVENTOR:
Alfred J. Huck,
BY Bair, Freeman & Molinare
ATTORNEYS.

United States Patent Office 2,843,718
Patented July 15, 1958

2,843,718
AIR HEATER

Alfred J. Huck, St. Louis, Mo., assignor to Knapp-Monarch Company, St. Louis, Mo., a corporation of Missouri Application April 29, 1957, Serial No. 655,728

1 Claim. (Cl. 219—39)

This invention relates to an air heater, and more particularly to a thermostatically controlled air heater, particularly one that may be used with a 240 volt source of power.

One of the problems that exists with respect to any air heater that is thermostatically controlled is the problem of insuring that the thermostat control for the air heater is not responsive to the heat from the heater, but is responsive solely to the temperature of the ambient air which is to be heated. The provision of heater elements which throw off a large amount of heat presents a particular problem in that there is a great tendency of the heat to radiate through the space enclosed by the heater casing, or to move by convection through the air passing through the heater back to the thermostat control and to thereby affect the operation of the thermostat, so that the thermostat is partially responsive to the heat being produced by the heating elements.

Thus, one object of this invention is to provide a simple and efficient air heater which is so constructed and arranged that the thermostat control therefor is responsive solely to the temperature of the air being drawn into the heater for the purposes of heating.

Another object of this invention is to provide a heater that is characterized by its novel and efficient disposition of operating portions thereof and its effectiveness of operation.

Another problem that exists with respect to the use of air heaters that are powered by a 240 volt source of electricity, is the fact that both leads from the 240 volt source of supply are usually required to pass through a thermostatically controlled switch. This arrangement is somewhat complicated and rather expensive, but must be utilized to provide a safety feature, so that if any of the wires short to the casing of the heater, there will be no danger to an individual.

Thus, a further object of this invention is to provide a simplified wiring arrangement for an electric air heater which eliminates the requirement that both power leads pass through the thermostatically controlled switch, and whereby there is required only a single-pole single-throw thermostatically controlled switch for controlling the operation of the various portions of the heater.

And another object of this invention is to provide a simplified wiring circuit for a 240 volt heater whereby the danger from receiving any electric shock because of a loose connection or the like is eliminated.

Further objects and advantages of this invention will become apparent as the following description proceeds and the features of novelty which characterize this invention will be pointed out with particularity in the claim annexed to and forming part of this specification.

A preferred embodiment of the invention is shown in the accompanying drawings, in which:

Figure 1 is a front elevation view illustrating the appearance of the air heater of this invention;

Figure 2 is a vertical cross section view taken substantially on line 2—2 of Figure 1;

Figure 3 is a top plan view of the Venturi baffle of this heater and is taken substantially on line 3—3 of Figure 2; and Figure 4 is a wiring diagram illustrating the simplified wiring circuit for the heater of this invention.

Referring now to the drawing, there is shown in the figures an air heater casing 10, having a front 12, back 14, top 16, bottom 18, and ends 20 and 22. The heater casing thereby encloses a space through which air must pass to be acted upon by the heater. Interior of the casing 10 there is provided a substantially horizontal panel 24 which effectively divides the interior space of the casing into an upper region generally indicated at 26, and a lower region generally indicated at 28. Disposed within the upper region 26 are a plurality of finned heater elements 30, the construction of which is well known in the art. The front side 12 of the casing is provided with outlet openings generally indicated at 32 through which heated air is discharged laterally from the heater.

The lower portion of the casing 10 is provided with a plurality of air inlets 34, in the back side 14 and bottom 18, through which air may be drawn in, into the lower region 28. Within the casing 10 and below panel 24, there is positioned a support frame 36 which carries thereon a fan motor 38 which is disposed in the lower region 28. Extending upwardly from fan motor 38 is drive shaft 40, which carries at the upper end thereof a fan 42.

The horizontal panel 24 is provided with a circular Venturi aperture 44. The fan 42 is disposed within the Venturi aperture 44 and cooperates therewith to define the orifice through which air is driven by means of fan 42. The opening 44 in plate 24 is referred to as a Venturi opening because of the fact that it meters the amount of air that passes therethrough from the lower region 28 into the upper region 26.

Also positioned in the lower region 28 is a thermostatic control 46 for controlling operation of the heater, and it will be noted that the thermostatic control means 46 is located in the lower region 28 wherein it is subject to passage thereover only of air that is being drawn into the heater. The horizontal panel 24 serves as a means for insulating the lower region 28 from heat radiated from the upper region 26, thereby shielding the thermostat control means 46 from the heating means 30, and the Venturi opening 44 cooperates with the fan 42 to prevent any air convection, or backflow, of heated air from the upper region 26 into the lower region 28, thereby insuring that the thermostat means 36 senses, and is responsive to, only the temperature of the air entering the heater 10.

Because of the fact that the fan 42 is positioned with its axis vertical, the air driven through the Venturi opening 44 would normally have only an upward component of movement. However, so as to cause the air to be discharged laterally through the air outlet openings 32 in the side 12 of the heater, the interior of the upper space 26 is provided with baffle members 48 and 50 which cooperate with the stream of air issuing from the fan 42 to effect turning of the air so that the air passes over the heater elements 30 and then discharges laterally through the air outlets 32.

Figure 4 of the drawing diagrammatically illustrates the wiring diagram for a heater of the type shown in Figures 1–3. It is desired to produce a high heat output, such as 3,000 watts, without using heater elements of special manufacture. Accordingly, an even plurality of heating elements 30 are provided, each of which is rated at 750 watts, 120 volts. Pairs of heating elements 30 are arranged in series, so that the pairs of heating elements may have a 240 volt source connected thereacross, The fan motor 38 is a 240 volt motor. There is also provided an indicator lamp 52 for the purpose of indicating when the heater is turned "on" or "off." The indicator lamp may be a 120 volt, 7 watt, lamp and it is connected in series with an appropriate resistor 54, such as a 2,000 ohm, 120 volt resistor.

There is shown, in Figure 4, a plug 56 for connection to a 240 volt source of supply. One lead 58 leads to an on-off switch generally indicated at 60 and thence to a contact point 62. The thermostatically controlled means 46 includes a switch 64 which is interposed between contact point 62 and a lead 66 which is a common circuit portion for the parallel circuits through the heating elements 30 and the 240 volt motor, 38. The indicator lamp 52 is connected from contact point 62 by means of lead 68 to a return lead 70. The heater circuits and the fan motor circuit are also all connected to the return lead 70. A third lead 72 leading from the plug 56 is arranged to be connected to ground and is shown connected to the metal casing 10 of the heater.

The arrangement is such that when the on-off switch 60 is open, all circuits are open and the heater is shut down. When the on-off switch 60 is closed, the circuit for the indicating lamp 52 is always energized, but the control of the circuits for heaters 30 and for the fan motor 38 is then controlled by the thermostatically controlled means 46 which includes switch 64, the operation of which is well known in the art.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

A 240 volt air heater comprising, in combination, a metal casing means defining a space through which air is drawn to be heated and to be discharged from the heater, a ground connection for said casing, horizontal panel means in said space dividing said space into upper and lower regions, heating means in said upper region including an even plurality of similar, 120 volt-rated, heater elements arranged with pairs of said heater elements in series with each other for having a 240 volt source of power impressed safely thereacross, air outlet openings in said casing communicating with said upper region, air inlet openings in said casing communicating with said lower region, said horizontal panel means defining a Venturi opening therethrough the axis of which is disposed vertically, vertically disposed fan means in said Venturi opening for drawing air through said air inlet openings, and through said lower region, and for forcing air through said Venturi opening into said upper region past said heating means and through said air outlet openings, thermostat means for controlling operation of said air heater positioned in said lower region so that it is responsive solely to the temperature of air entering the heater, said horizontal panel shielding the thermostat means therebelow from the heating means thereabove, and the Venturi opening with fan therein preventing any back-flow of heated air from said upper region into said lower region, thereby insuring that said thermostat means senses only the temperature of the air entering the heater, and baffle means in said upper region for assisting in directing the flow of air from said Venturi so as to discharge the heated air laterally from said heater.

References Cited in the file of this patent
UNITED STATES PATENTS

| | | |
|---|---|---|
| 2,067,481 | Findlay | Jan. 12, 1937 |
| 2,259,258 | McCormick | Oct. 14, 1941 |
| 2,631,217 | Aufiero | Mar. 10, 1953 |
| 2,707,745 | Farr et al. | May 3, 1955 |
| 2,722,594 | Kueser | Nov. 1, 1955 |